United States Patent
Stephan et al.

(10) Patent No.: US 11,380,007 B2
(45) Date of Patent: Jul. 5, 2022

(54) SYSTEMS AND METHODS FOR SCAN ALIGNMENT

(71) Applicant: The Boeing Company, Chicago, IL (US)

(72) Inventors: Andrew Jon Eugene Stephan, Annerley (AU); Graham Day, Cornubia (AU)

(73) Assignee: The Boeing Company, Chicago, IL (US)

( * ) Notice: Subject to any disclaimer, the term of this patent is extended or adjusted under 35 U.S.C. 154(b) by 109 days.

(21) Appl. No.: 16/820,700

(22) Filed: Mar. 16, 2020

(65) Prior Publication Data

US 2021/0287388 A1  Sep. 16, 2021

(51) Int. Cl.
*G06T 7/33* (2017.01)
*G06T 7/60* (2017.01)
*G06T 7/00* (2017.01)

(52) U.S. Cl.
CPC .............. *G06T 7/60* (2013.01); *G06T 7/0004* (2013.01); *G06T 7/33* (2017.01); *G06T 7/97* (2017.01); *G06T 2207/10028* (2013.01); *G06T 2207/30164* (2013.01)

(58) Field of Classification Search
CPC .... G06T 7/60; G06T 7/97; G06T 7/33; G06T 7/0004; G06T 2207/10028; G06T 2207/30164
USPC ....... 382/154, 100, 151, 152, 312, 313, 318, 382/319, 203, 199
See application file for complete search history.

(56) References Cited

U.S. PATENT DOCUMENTS

| | | | | |
|---|---|---|---|---|
| 4,523,973 | A | * | 6/1985 | Nelson .................... B44C 1/227 216/100 |
| 2001/0056282 | A1 | * | 12/2001 | Sonnenschein .... A61B 1/00181 606/139 |
| 2015/0229032 | A1 | * | 8/2015 | Liu ......................... H01Q 3/20 343/766 |
| 2017/0343336 | A1 | * | 11/2017 | Lettau .................... G01B 11/14 |

OTHER PUBLICATIONS

Hubbs Machine, "Optical Targeting Specialties for Metrology Support Systems," Dec. 2002, retrieved from www.hubbsmachine.com on Feb. 11, 2020, 3 pages.

(Continued)

*Primary Examiner* — Sheela C Chawan
(74) *Attorney, Agent, or Firm* — Kolisch Hartwell, P.C.

(57) ABSTRACT

A method of aligning scans of a workpiece is disclosed, including coupling a set of reflective boundary targets along an edge of a workpiece having first and second opposing facial surfaces. The boundary targets are detectable by a surface scanning device when scanning the first facial surface and when scanning the second facial surface of the workpiece. The method further includes scanning the first facial surface of the workpiece, generating a first data set and scanning the second facial surface of the workpiece, generating a second data set. The first and second data sets each include spatial points corresponding to locations of the reflective boundary targets. The method further includes aligning the spatial points of the first data set with the spatial points of the second data set.

20 Claims, 8 Drawing Sheets

(56) References Cited

OTHER PUBLICATIONS

Olympus Industrial Solutions, "MagnaMike 8600 Thickness Gage," Nov. 6, 2012, retrieved from www.olympus-ims.com/en/magna-mike8600/ on Feb. 11, 2020, 6 pages.

Faro, "FaroArm®—Portable 3D Measurement Arm for Any Application," Jul. 2019, retreived from www.faro.com/products/3d-manufacturing/faroarm/ on Feb. 11, 2020, 9 pages.

CreaForm, "HandySCAN 3D Professional Metrology-Grade 3D Scanners," Nov. 18, 2020, retrieved from www.creaform3d.com/en/portable-3d-scanner-handyscan-3d on Feb. 11, 2020, 8 pages.

\* cited by examiner

SYSTEMS AND METHODS FOR SCAN ALIGNMENT

BACKGROUND

Three-dimensional (3D) scanners based on a variety of technologies are used to collect and digitize information about the shape of objects. Such scans are useful in many applications, including reverse engineering, prototyping, inspection, and industrial design. However, commercially available scanners vary in precision, and highly precise scanners are often prohibitively expensive.

Small-scale scanners such as hand-held triangulation laser scanners offer a less costly option, but introduce opportunities for error resulting from movement of a scanned object. For example, vibration, thermal expansion, and flexing due to air pressure changes can all distort a scan. The longer the scan, the more opportunity for error. Additionally, movement by a user of a hand-held scanner can introduce vibration and produce changes in air pressure.

Thin or delicate parts may be particularly susceptible to such movement during scanning. For example, parts that are incrementally sheet formed (ISF) from sheet metal may be prone to flexing. A method of scanning with an inexpensive scanner that limits scan error for such parts is desirable, for instance to facilitate cost-effective inspection of ISF parts.

SUMMARY

The present disclosure provides systems, apparatuses, and methods relating to Alignment of 3D scans. In some examples, a method of aligning scans of a workpiece may include coupling a set of reflective boundary targets along an edge of a workpiece having first and second opposing facial surfaces. The boundary targets may be detectable by a surface scanning device when scanning the first facial surface and when scanning the second facial surface of the workpiece. The method may further include scanning the first facial surface of the workpiece, generating a first data set and scanning the second facial surface of the workpiece, generating a second data set. The first and second data sets may each include spatial points corresponding to locations of the reflective boundary targets. The method may further include aligning the spatial points of the first data set with the spatial points of the second data set.

In some examples, a method of measuring thickness of a workpiece may include coupling a plurality of reflective targets to an edge of a workpiece having first and second sides. The method may further include generating a first scan of the first side of the workpiece including detecting the plurality of reflective targets, and generating a second scan of the second side of the workpiece including detecting the plurality of reflective targets. The method may further include aligning the first and second scans, and determining a thickness of the workpiece based on data obtained from the first and second scans.

In some examples, a system for measuring thickness of a workpiece may include a set of reflective boundary targets, a set of facial targets, a scanner, and a processor. The boundary targets may be configured for fastening to an edge of a workpiece, and the facial targets may be configured for fastening to first and second opposing faces of the workpiece. The scanner may be configured to generate first and second scans of the first and second faces, detecting spatial locations of the boundary targets and facial targets. The processor may be configured to align data sets from the first and second scans, and to calculate a thickness of the workpiece based on the data sets.

Features, functions, and advantages may be achieved independently in various examples of the present disclosure, or may be combined in yet other examples, further details of which can be seen with reference to the following description and drawings.

DETAILED DESCRIPTION

Figure 1:
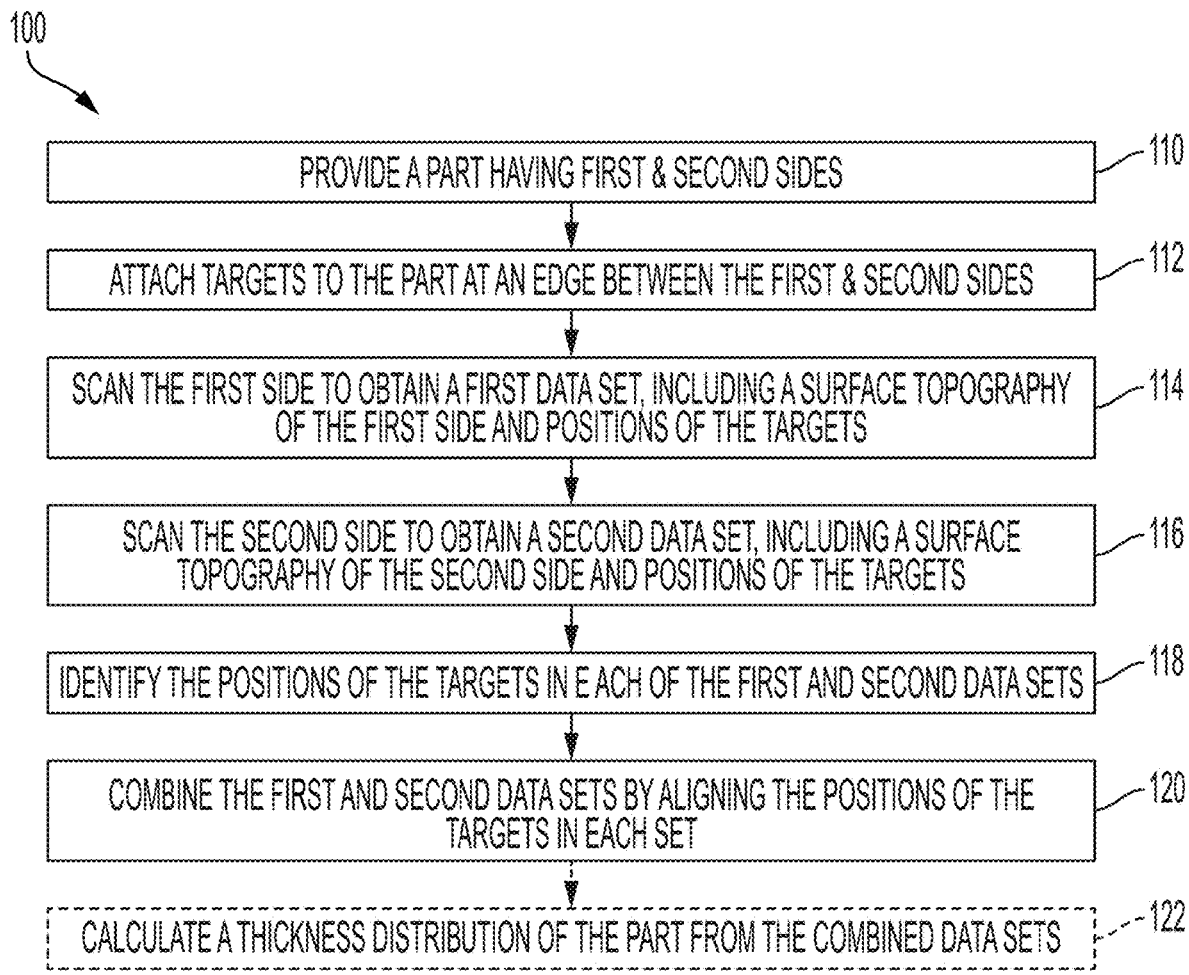
FIG. 1. is a flow chart depicting steps of an illustrative method for aligning scans according to the present teachings.

Various aspects and examples of a method of aligning scans, as well as related methods and apparatus, are described below and illustrated in the associated drawings. Unless otherwise specified, a method and/or apparatus used in performing a method in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A and B, which are labeled accordingly.

Overview

In general, a method of aligning scans in accordance with the present teachings includes coupling a set of at least three boundary targets to a workpiece. The workpiece may have a first side and a second, opposing side which meets the first side at an outer edge. The set of boundary targets may be coupled to the outer edge of the workpiece, such that each target is detectable both in a scan of the first side and in a scan of the second side.

The method may further include separately scanning the first and second sides of the workpiece to obtain first and second sets of scan data. The first and second sets of scan data may be processed to isolate a set of boundary points in each data set, corresponding to the positions of the set of boundary targets. The set of boundary points in the first set of scan data may be aligned with the set of boundary points in the second set of scan data. All remaining points of the of the first and second set of scan data may then be aligned accordingly.

The method may be performed using a scanning alignment system which includes the workpiece, the boundary targets, and a scanner. The boundary targets may be configured for easy attachment to and removal from the workpiece, in an orientation allowing scanning from each side of the workpiece. The boundary targets may also be configured to be detected and located by the scanner. The scanner may include any scanning technology effective for collection of three dimensional surface topology data as well as detection and location of targets relative to the surface topology.

Preferably, the boundary targets may comprise markers, targets, and/or indicia designed for use in standard scanning by the selected scanner. For example, the boundary targets may include adhesive retroreflectors sold with a handheld 3D laser scanner for application to a scanned workpiece to allow positional tracking by the scanner. Use of such off-the-shelf equipment where the targets and scanner are already designed and configured for use together, may reduce costs and simplify implementation of scan alignment.

Figure 2:
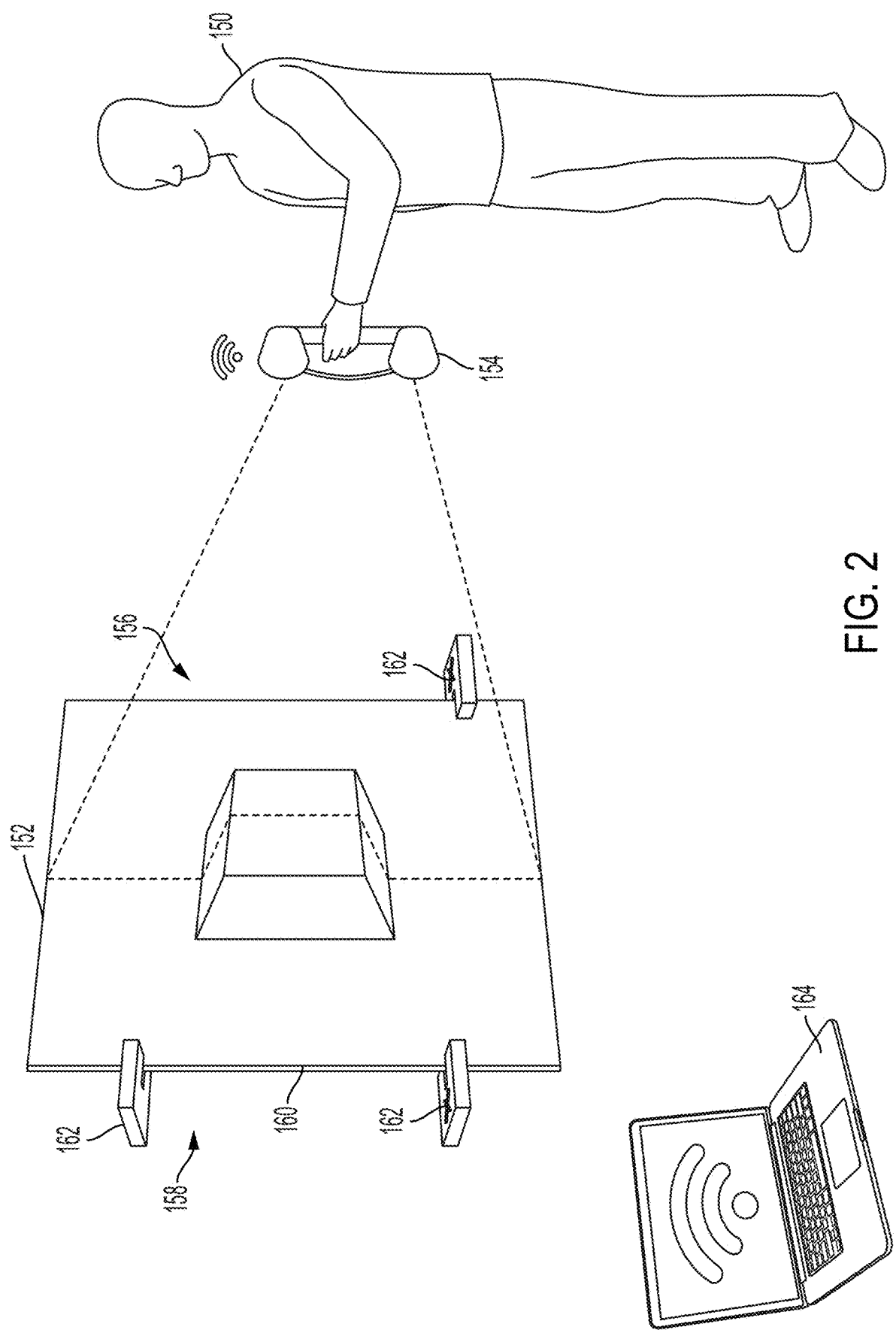
FIG. 2 is a schematic diagram of an illustrative scanning system as described herein.

FIG. 1 is a flow chart depicting steps of an illustrative method 100 of aligning scans, and FIG. 2 is a schematic diagram of a user 150 performing method 100 on a workpiece, or part 152, with a scanner 154. Step 110 of the method includes providing part 152, which has a first side 156 and a second side 158. Part 152 may include any object for which analysis is desired, of any appropriate material. Examples include, but are not limited to formed sheet metal, cured composites, and/or additively manufactured polymer.

In step 112, the method includes attaching targets 162 to part 152 at an edge 160 between the first and second sides. In FIG. 2, edge 160 is shown as rectangular. In general, part 152 may have any shape which includes first and second opposing sides which meet at an edge lying in a single plane and having a known shape. For example, part 152 may have a circular or regular hexagonal edge shape. The known shape of edge 160 may then be used in analysis of scan data, as described further below.

Part 152 may have any shape allowing sufficient visibility of edge 160 from each side of the part. That is, in the present example, part 152 includes a thin edge portion and a central portion that is convex on first side 156 and concave on second side 158. In some examples, part 152 may have a substantially consistent thickness across all portions, may be convex or concave on both the first and second sides, or may have multiple distinct protrusions. However, part 152 may not be shaped such that targets 162 attached to edge 160 are obscured for scanner 154, either from first side 156 or second side 158.

Step 114 of the method includes scanning first side 156 with scanner 154 to obtain a first data set that includes a surface topography of the first side and positions of targets 162. That is, the step includes scanning both the 3D shape of the surface of first side 156, and the location of targets 162 relative to the surface.

Scanner 154 is depicted in FIG. 2 as a hand-held laser scanner, manually operated by user 150. In this example, scanning first side 156 may include translating the scanner horizontally and/or vertically relative to part 152 such that a scanning laser line or grid of the scanner covers the first side and targets 162. In general, scanning may include any steps appropriate to use of the selected scanner. Preferably, movement by user 150 during scanning may be limited as much as possible, to reduce effects on part 152. For instance, in the present example of hand-held scanner 154, user 150 may complete the scan by movement of an arm supporting the scanner and without walking or moving from a fixed standing position.

Before proceeding to step 116, the method may include re-positioning scanner 154 and/or user 150. For instance, in the present example, user 150 may walk around to face second side 158. Alternatively, a scanner arm may be moved to address the second side, or a scanner may be otherwise prepared for step 116. Preferably, part 152 may not be moved between steps 114 and 116, to prevent the introduction of positional error. Similarly, vibration or other unwanted motion induced in the part may be allowed to subside prior to proceeding with step 116.

Step 116 of method 100 includes scanning second side 158 to obtain a second data set that includes a surface topography of the second side and positions of targets 162. That is, the step includes scanning both the 3D shape of the surface of second side 158, and the location of targets 162 relative to the surface. Similarly to step 114, step 116 may be performed according to the appropriate operation of scanner 154, preferably with a minimum of potential disturbance to part 152.

At step 118, method 100 includes identifying the positions of targets 162 in each of the first and second data sets. More specifically, the step may include using a computer or other data processing system to analyze each of the first and second data sets and tag, label, and/or otherwise identify a set of target data points in the data set which correspond to the locations of targets 162. In some examples, user 150 or another user may select the set of target data points from a graphical display of the data set by the data processing system. In some examples, the set of target data points may be identified automatically by software implemented on the data processing system. The data sets may be analyzed separately. For example, the positions of targets 162 may be identified in the first data set, and then the positions of targets 162 may be identified in the second data set.

In the present example, scanner 154 is in wireless communication with a laptop computer 164. Scan data is uploaded from the scanner to the computer. Analysis is performed by software implemented by the computer, which may include any effective combination of commercially available software and custom software. For example, analysis may be performed in part by software provided with scanner 154, and in part by a custom algorithm run in a commercially available data processing program.

Additional data regarding parameters of method 100, targets 162, and/or part 152 may be included in the analyses along with the first and second data sets obtained from the scans performed in steps 114 and 116. For example, the number of targets 162 attached to edge 160 in step 112 and/or the shape of edge 160 may be included in the analyses. In some examples, identifying the positions of targets 162 may include distinguishing the targets from other targets scanned in steps 114 and 116.

Step 120 of the method includes combining the first and second data sets by aligning the positions of targets 162 in each set. The step may also be performed on the computer or data processing system used in step 118. Aligning the positions of targets 162 may include comparing the set of target data points in each data set that was identified in step 118 as corresponding to the locations of targets 162 and matching each target data point from the first set of target data points with a respective target data point from the second set of target data points.

Combining the first and second data sets may include translating positional information in each data set to a shared coordinate system, such distances between that target data points of the first set of target data points and the respective target data points of the second set of target data points are minimized. For example, a least squares fit may be performed on the two sets of target data points.

Optional step 122 includes calculating a thickness distribution of part 152 from the combined data sets. Digital modeling and/or geometrical analysis techniques known to one skilled in the art may be employed to calculate the thickness distribution. For example, computer aided design software may be used to calculate a separation between aligned first and second triangulated meshes corresponding to the 3D surface topologies of first side 156 and 158.

Determining thickness is one example of a useful application of scan alignment. Method 100 may further include any steps appropriate to other applications of or uses for aligned scans. Use of the method of scan alignment as described herein may allow use of an off the shelf inexpensive scanner system with minimal alteration to achieve high precision. Use of the described method may also reduce opportunities for systematic error to be introduced into scan data by avoiding inclusion of user estimations and/or input of separately measured quantities.

Technical solutions are disclosed herein for aligning 3D scans of a workpiece. Specifically, the disclosed system/method addresses a technical problem tied to scanner technology and arising in the realm of digital scan processing, namely the technical problem of aligning multiple digital scans of a workpiece. The system and method disclosed herein solves this technical problem by associating positional information for alignment targets on the workpiece with the digital scans. The disclosed systems and methods do not merely recite the performance of some known practice along with the requirement to perform it on a computer. Rather they provide a practical application of geometrical analysis and use of scanner technology to overcome a problem specifically arising in the realm of digital scanning and analysis.

Aspects of methods for scanning, alignment of scans, and/or calculation of a thickness distribution for a workpiece as described herein may be embodied as a computer method, computer system, or computer program product. Accordingly, aspects of the methods may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the methods may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the methods of scanning, alignment, and/or calculation of thickness may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the methods described herein are described with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the methods described herein. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary methods of aligning scans of a workpiece as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Scanning System

As shown in FIGS. 3-11, this section describes an illustrative thickness scanning system 200. System 200 is an example of a scanning alignment system as described above. In general, the system includes a workpiece 210 shown in FIG. 3, a set of targets 212 shown in FIG. 4, and a scanner which is not depicted. The system may further include a computer or digital processing system.

Figure 3:
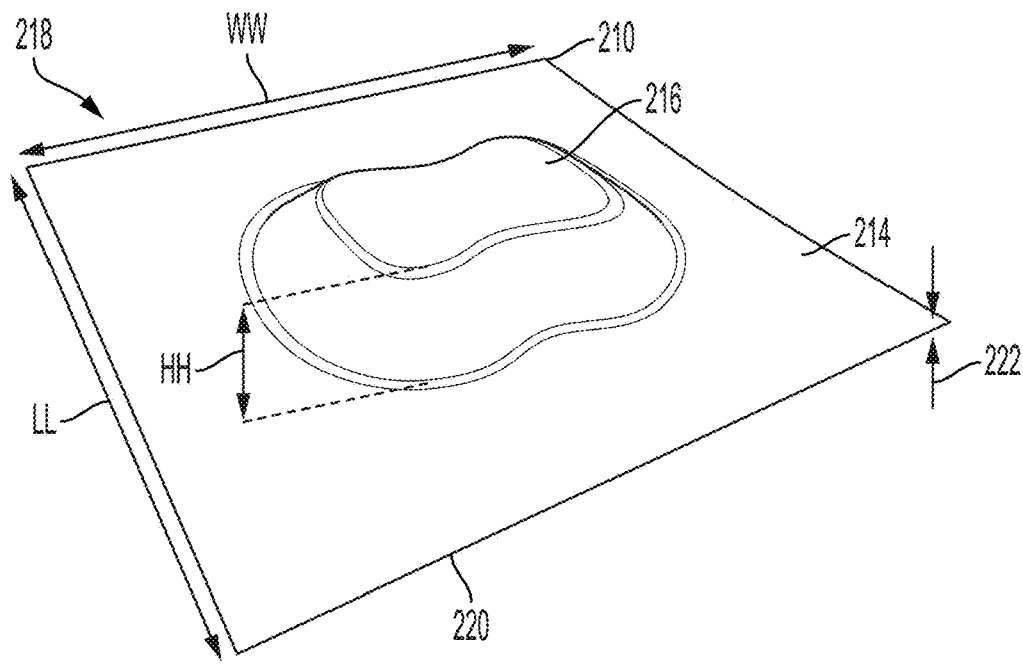
FIG. 3 is an isometric view of an illustrative incrementally sheet formed (ISF) part in accordance with aspects of the present disclosure.

In the present example, as shown in FIG. 3, workpiece 210 is an incrementally sheet formed (ISF) part. The ISF part is comprised of a uniform thickness sheet of metal, such as aluminum or stainless steel, which is deformed to produce a desired shape. ISF part 210 includes a peripheral sheet portion 214 of unaltered sheet metal, and a central molded portion 216. Sheet portion 214 retains the rectangular outer shape and uniform thickness of the original sheet metal, while molded portion 216 may have varying thickness according to the molded shape.

Figure 5:
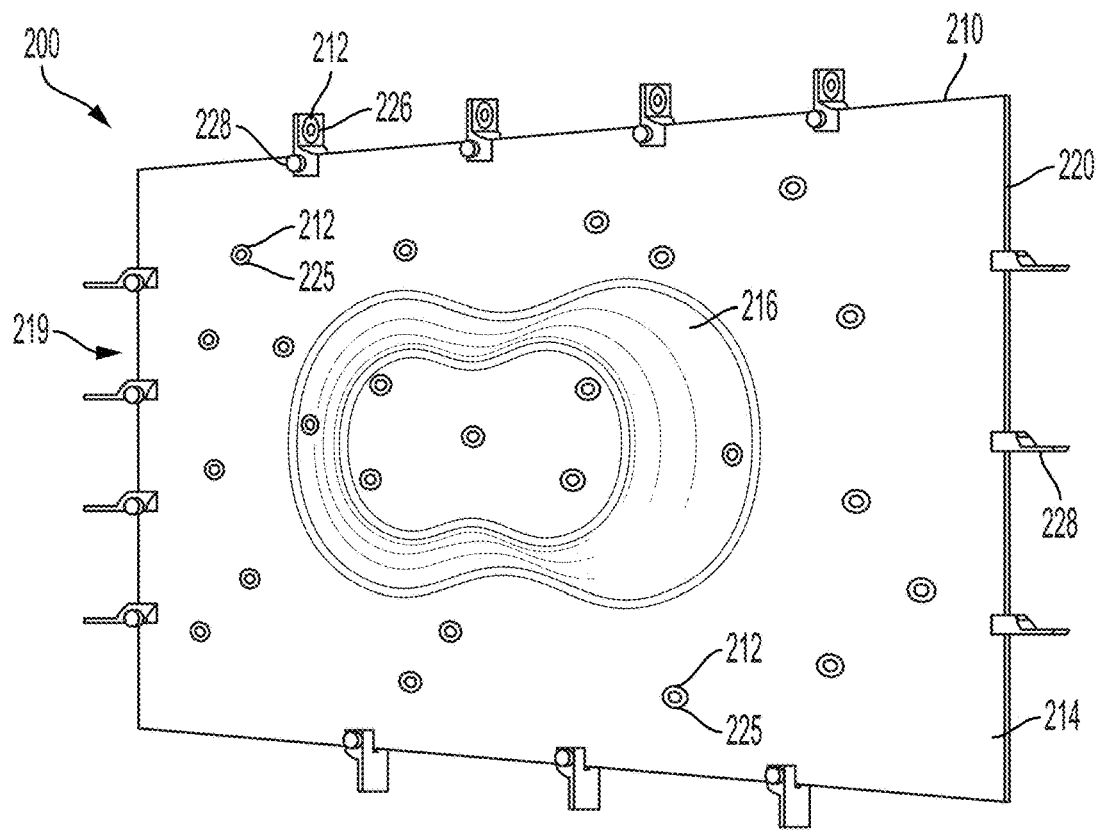
FIG. 5 is an isometric view of the second side of the ISF part of FIG. 3, with attached targets.

ISF part 210 has a first side 218, and a second side 219 which can be seen in FIG. 5. The first and second sides may also be referred to as faces, or facial surfaces of ISF part 210. Molded portion 216 projects outward relative to sheet portion 214 on first side 218. The second side is opposite the first side, and molded portion 216 is recessed relative to sheet portion 214 on the second side. First side 218 and second side 219 meet at a rectangular edge 220.

In the depicted example, molded portion 216 has a rounded bow-tie shape with linearly sloped sides and is centered in sheet portion 214. In general, the molded portion may have any desired shape, including curved, polygonal, and/or linear sides or edges. Molded portion 216 may also be located at any point in sheet portion 214, though preferably may be spaced from edge 220. Molded portion 216 may also extend no more out of the plane of sheet portion 214 than the extent of the sheet portion in plane. That is, sheet portion 214 has a length LL and a width WW, while molded portion 216 has a height HH in a direction perpendicular to the plane defined by the length and width. Height HH is less than length LL and width WW.

Inspection of ISF part 210 and/or analysis of the process used to produce the part may include measuring a thickness distribution of the part. The measured thickness may then be compared to a designed or ideal distribution of material in molded portion 216. The thickness distribution to be measured may be defined as a thickness 222 at each location on ISF part 210, where thickness 222 is a distance from first side 218 to second side 219 along a line perpendicular to the plane of sheet portion 214. Thickness 222 may be measured by scanning the 3D surface topography each side, and calculating the distance between the sides.

In the depicted example, length LL and width WW are each approximately twenty four inches. Thickness 222 of sheet portion 214 is between approximately one and two millimeters. At such a scale of thickness, movement down to the order of micrometers may have significant adverse impact on scans and scan alignment. Part 210 may be any size that can be effectively scanned by the selected scanner. For example, when using a handheld scanner, part 210 may be sufficiently small for a user to scan by arm movement alone. For instance, part 210 may be up to five feet in length and/or width. Part 210 may also be sufficiently thin to allow effective scanning of edge 220. For instance, thickness 222 may be no more than a foot, proximate edge 220.

Figure 4:
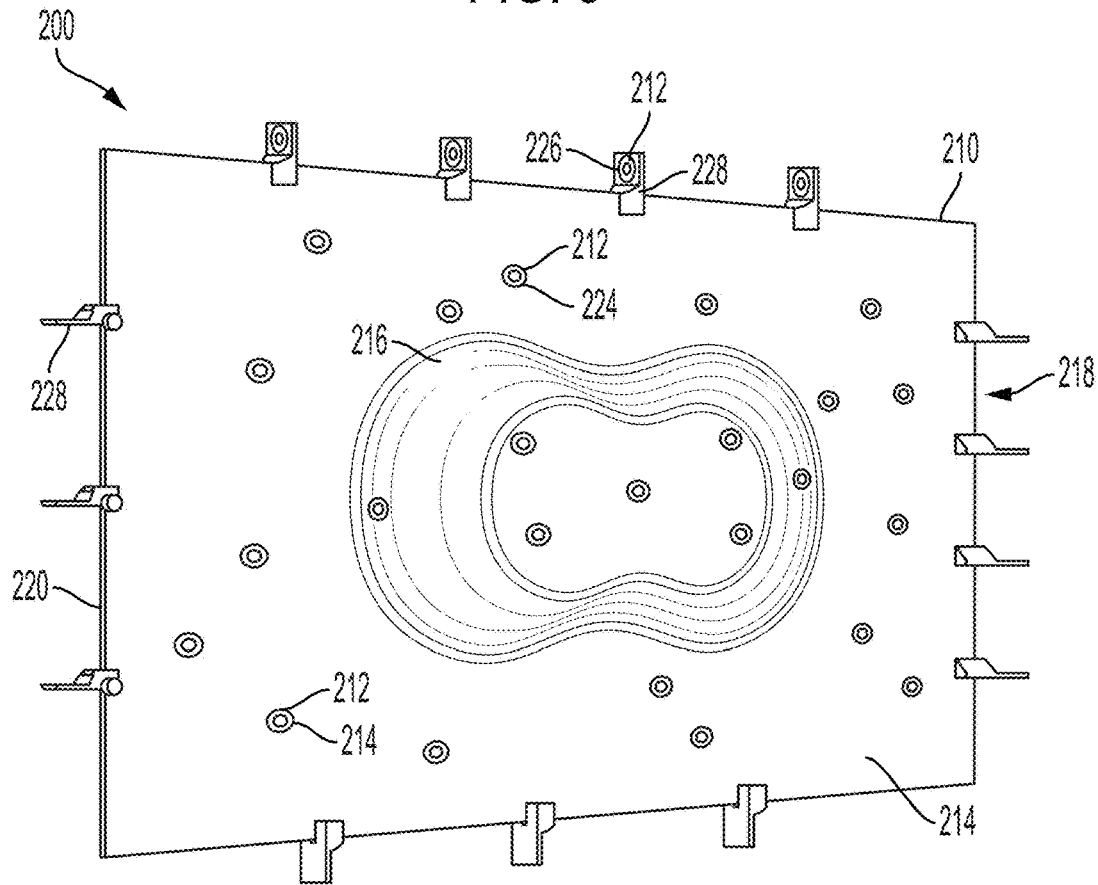
FIG. 4 is an isometric view of the first side the ISF part of FIG. 3, with attached targets.

FIGS. 4 and 5 show ISF part 210 prepared for scanning with targets 212, with first side 218 shown in FIG. 4 and second side 219 shown in FIG. 5. The part may additionally be supported and stabilized by a structure which is not shown, such as clamps, a worksurface, a jig, and/or a stand. Targets 212 are attached to ISF part 210 in three sets, a first set 224 applied to first side 218, a second set 225 applied to second side 219, and a boundary set attached at edge 220.

In the present example, targets 212 are all adhesive retroreflectors configured for use with a hand-held laser triangulation 3D scanner. The targets may be described as stickers, and each include a removable adhesive on one side. Each target may include a ring of black or light-absorbing material surrounding a circle of retroreflective material.

Both the scanner and retroreflectors may be commercially available, and used with the thickness scanning system without need for modification. Use of such off-the-shelf equipment may reduce cost and lead time for the thickness scanning system. In general targets 212 may include any material and/or technology configured for detection by a selected scanner. The targets may be purchased or custom-produced, and may be attached to ISF part 210 in any effective manner.

As shown in FIG. 4, first set 224 of targets 212 are adhered directly to the surface of ISF part 210. After scanning is complete, the sticker targets may be peeled from the surface and discarded or reused. First set 224 of targets may be applied to first side 218 according to scanner directions, such that the targets support complete and accurate scanning of the first side. The targets may be distributed generally randomly, but with sufficient density and distribution to facilitate scanning. First set 224 may include any number of targets sufficient for scanning of first side 218. For example, the first set may include at least seven or eight targets. The number of targets in first set 224 may depend on the geometry of molded portion 216 and the overall size of ISF part 210.

As shown in FIG. 5, second set of targets 225 are similarly adhered to second side 219 of ISF part 210. In contrast, boundary targets 226 are clamped to edge 220 of the part. Each boundary target is adhered to a clamp 228, which is secured to the edge of the part. At least three boundary targets 226 may be used, and additional targets may improve alignment. In the present example, fourteen boundary targets 226 are clamped to edge 220, and multiple boundary targets are clamped to each of the four sides of the rectangular edge. In some examples, boundary targets 226 may be couple to only some sides of the rectangular edge and/or some portion of the edge. For instance, part 210 may be supported by a stand along a lower side of edge 220, and boundary clamps 226 may be clamped only to left, right, and upper sides of the edge.

Figure 6:
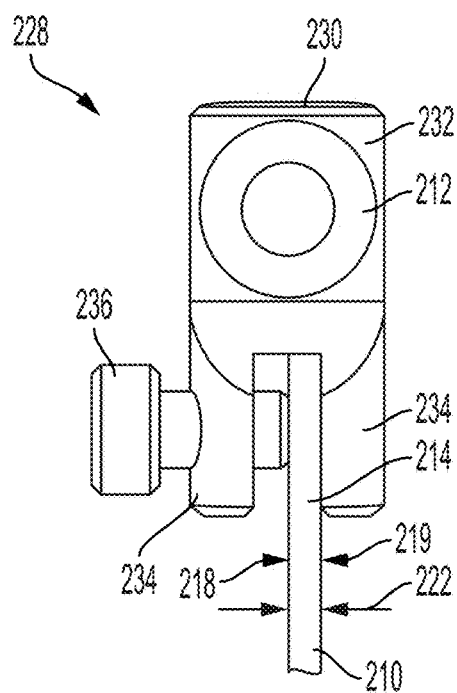
FIG. 6 is a top view of one of the target clamps of FIGS. 4 and 5.

As shown in FIG. 6, each clamp 228 includes a main body 230 with a flat surface 232. A target 212 is adhered to the flat surface. Two legs 234 extend from main body 230, one of the legs including a threaded aperture to receive a clamp bolt 236. Legs 234 are spaced from one another to form a recess such that edge 220 of sheet portion 214 of ISF part 210 can be received between the legs. One leg contacts either the first or second side of the part, while clamp bolt 236 is tightened to press against the opposite side. In this manner, flat surface 232, and therefore also the adhered target 212, are oriented perpendicular to edge 220 and to the plane of sheet portion 214.

Referring again to FIG. 4, when target clamp 228 is secured to edge 220, boundary targets 226 are detectible by the scanner from both sides of ISF part 210. That is, the boundary targets are positioned to be detected in a scan of either first side 218 or the second side. The boundary targets do not require turning, angling, and/or other repositioning between scans, and remain in a fixed position throughout scanning. In general, boundary targets 226 may be attached to ISF part 210 at edge 220 in any manner allowing such detection from both sides.

Once prepared as shown in FIGS. 4 and 5, the scanner of the thickness scanning system is used to scan first side 218 and second side 219 of ISF part 210. The sides may be scanned according to any effective method, for instance method 300 as described below. Each side may be scanned such that all of boundary targets 226 are detected in the scan. Preferably, one side may be scanned and then the other.

Figure 7:
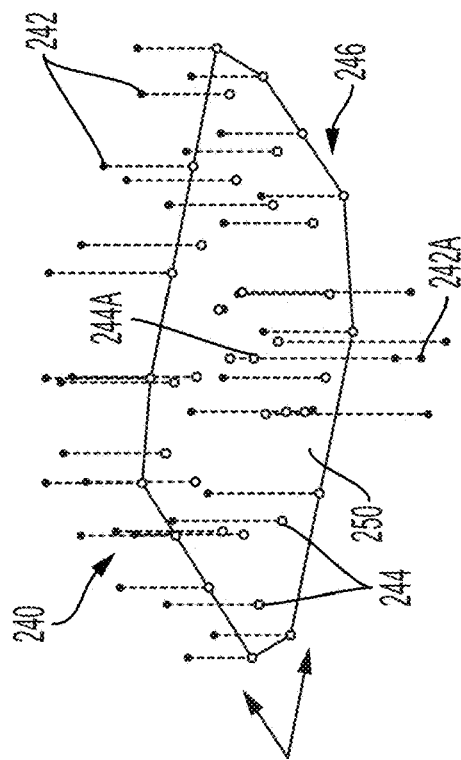
FIG. 7 is a schematic diagram of a point cloud resulting from a scan of the first side of the ISF part and boundary targets of FIG. 4, and a convex hull of a projection of the point cloud onto a plane.
Figure 10:
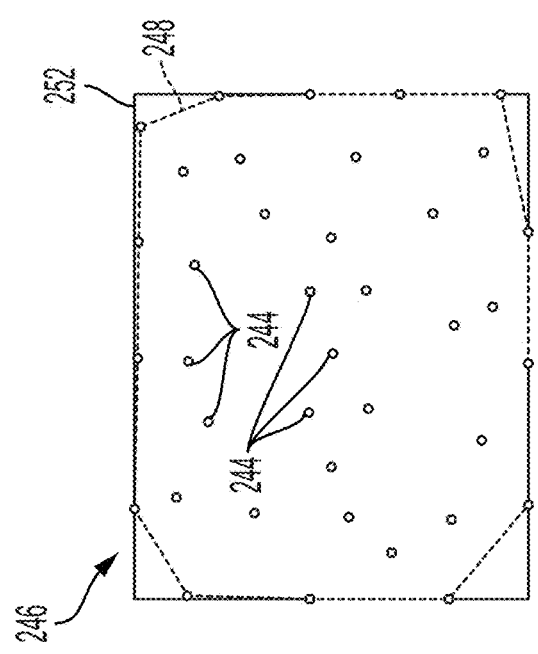
FIG. 10 is a schematic diagram of the projection and minimum bounding rectangle of FIG. 9, further including selected and ordered boundary points.

A first set of data resulting from the scan of first side 218 may include a triangulated mesh 260 of the surface topography, as shown in FIG. 10, and a point cloud 240, as shown in FIG. 7. In some examples, the first set of data may include precursor data for processing into triangulated mesh 260 and/or other data appropriate to represent scanned surface topography. The data resulting from the scan may depend on the selected scanner, and may be processed and/or pre-processed as appropriate for that scanner.

Turning to FIG. 7, point cloud 240 includes a plurality of position data points 242, each point having coordinates in a three-dimensional coordinate system and each point corresponding to a location of a target 212 of either the targets of first set 224 or boundary targets 226 (see FIG. 4). Points 242 corresponding to boundary targets 226 may be referred to as boundary points. The boundary points of point cloud 240 may not be a priori distinguishable from points corresponding to the targets of first set 224. That is, points 242 corresponding to boundary targets 226 may not be labeled or identified in point cloud 240 as generated by the scan of the first side.

Position data points 242 of point cloud 240 are associated with the triangulated mesh of the first set of data. The triangulated mesh may be described as defined by the point cloud and/or by edges between the points of the cloud. To identify the boundary points, point cloud 240 may be manipulated and/or analyzed. Triangulated mesh 260 may be transformed as part of such manipulation or analysis, such that the spatial relationship between point cloud 240 and the triangulated mesh is preserved.

Also shown in FIG. 7, is a projection of each point 242 of point cloud 240 onto the x-y plane of the three-dimensional coordinate system. The projection may be referred to as a projected point 244, and the plurality of projection points may form a cloud projection 246. For example, a point 242A projects onto the x-y plane as projected point 244A. A convex hull 248 is drawn around cloud projection 246. That is, the smallest convex polygon enclosing the set of projected points 244 is calculated. In some examples, other bounding shapes such as an alpha shape or minimum bounding rectangle may be used in place of the convex hull.

Figure 8:
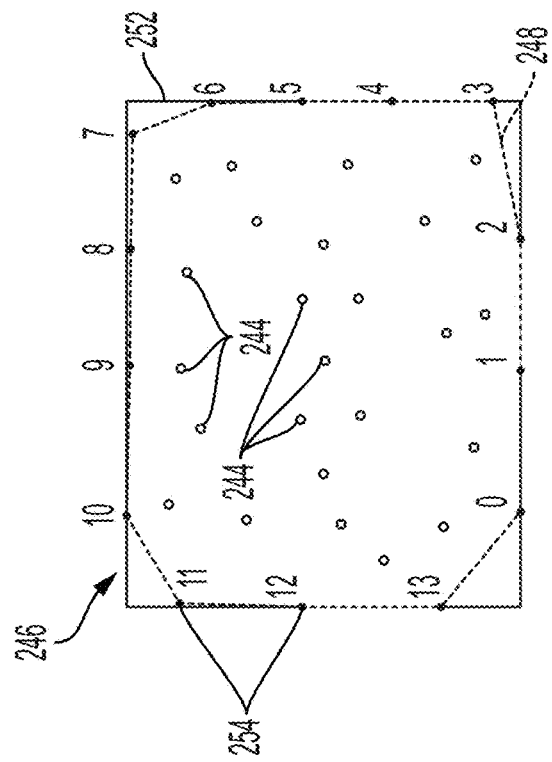
FIG. 8 is a schematic diagram of the point cloud of FIG. 7, rotated to optimize the area of the convex hull.

Point cloud 240 can be rotated relative to the three-dimensional coordinate system. As the point cloud is rotated, projected points 244 and projected cloud 246 are altered accordingly. The point cloud can therefore be oriented to achieve a desired change in convex hull 248 of the projected cloud. More specifically, the point cloud is rotated to maximize an area 250 enclosed by convex hull 248 in the x-y plane, as shown in FIG. 8.

Maximizing area 250 enclosed by convex hull 248 may effectively orient point cloud 240 relative to the x-y plane to correspond to the orientation of the targets of first set 224 and boundary targets 226 relative to the plane of sheet portion 214 of ISF part 210 (see FIG. 4). The greater planar extent of sheet portion 214 as compared to the height of molded portion 216 (see FIG. 3) may allow this maximization to result in the desired correspondence of orientation.

One skilled in the art may note two possible degeneracies in the projection and rotation of point cloud 240, introduced by inversion and rotation about the z-axis of the three-dimensional coordinate system. For instance, in the present example, in the orientation of FIG. 8 point cloud 240 is inverted relative to the initial orientation shown in FIG. 7. This change can be seen, for example, by the movement of point 242A from above the x-y plane in FIG. 7 to below the x-y plane in FIG. 8. Such inversion may result in a reflection of cloud projection 246, without altering the area enclosed by convex hull 248. Similarly, rotation about the z-axis may only rotate cloud projection 246 and leave the area enclosed by convex hull 248 unchanged. However, such degeneracies are eliminated when the boundary points from the first and second sets of data are fitted together, as described further below.

Figure 9:
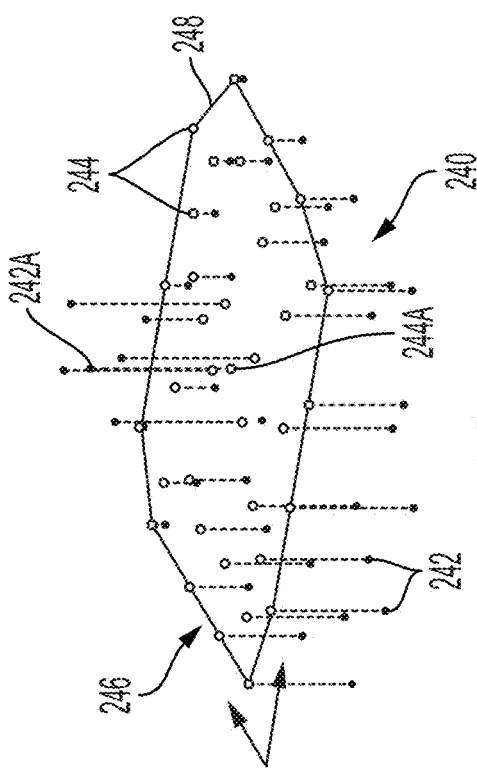
FIG. 9 is a schematic diagram of the projection onto the plane of the rotated point cloud of FIG. 8, further including a minimum bounding rectangle.

FIG. 9 shows cloud projection 246 of point cloud 240 onto the x-y plane, as created by the orientation of the point cloud that maximizes the area enclosed by convex hull 248. The convex hull is enclosed by a minimum bounding rectangle 252. As a result of the orientation of point cloud 240, minimum bounding rectangle 252 may approximate the shape and location of rectangular edge 220 of ISF part 210 (See FIG. 3). In examples where edge 220 has a non-rectangular shape, a matching minimum bounding geometry may be calculated. For example, for a circular edge 220, the minimum bounding circle may be found.

A set of boundary points 254 are selected from point cloud 240 according to minimum bounding rectangle 252. That is, a subset of N projected points 244 closest to the minimum bounding rectangle are selected, and the corresponding position data points 242 are identified as boundary points 254. The number N of projected points selected is equal to the number of boundary targets 226 attached to ISF part 210 (See FIG. 4). In the present example, N=14 and the fourteen projected points 244 closest to minimum bounding rectangle 252 are selected, as shown in FIG. 10.

The selected projected points 244, and corresponding position data points 242, are cyclically ordered. In other words, for the set of selected points where each point is connected to the two closest points, a chordless cycle is found and the points are assigned a number according to order of occurrence in the cycle. The ordering is indicated in FIG. 10 for projected points 244, but applied also to the corresponding position data points 242. The starting point of the cycle is arbitrary, and any of the selected points may be first in order. Similarly, the direction clockwise or counter-clockwise of the cycle is arbitrary and either may be used. Ordering of the selected projected points 244 and corresponding position data points 242 may be performed by a user and/or automatically performed by analytic software.

From this analysis of the first set of data, obtained from the scan of the first side of the ISF part, is extracted a first cyclically ordered set of boundary points 254, which correspond to the boundary targets attached to the edge of the part. The second set of data, including a second point cloud and a second triangulated mesh 262 (see FIG. 10), obtained from the scan of the second side of the ISF part, is similarly analyzed to extract a second cyclically ordered set of boundary points, which also correspond to the boundary targets attached to the edge of the part.

The first and second cyclically ordered sets of boundary points 254 are then checked. As the starting point of the ordering is arbitrary, the ordering of the sets may be offset by any number between zero and N the number of boundary targets, in this case fourteen. As the direction of the ordering is also arbitrary, the order may be reversed between the two sets. Cyclically ordering the first and second sets of selected points limits this checking process to only 2N sets of point comparisons, streamlining and speeding up analysis of the scan data.

Once any offsets or reversals of the first and second sets of boundary points 254 are resolved, the first set of boundary points can be aligned in a least squares sense with the second set of boundary points. Each boundary point in the first set is now associated with a corresponding boundary point in the second set. Therefore, the two sets of boundary points are positioned relative to one another such that the sum of the squared differences between the positions of each pair of corresponding boundary points is minimized. Any degeneracies introduced by projection and rotation of the point clouds may now be eliminated.

Based on the alignment of boundary points 254, the remaining position data points 242 of each point cloud 240 are also aligned. As shown in FIG. 10, first triangulated mesh 260 and second triangulated mesh 262 are also aligned according to the alignment of boundary points 254 and the spatial relationship between the triangulated meshes and the boundary points. Alignment of the meshes may be unaffected by noise in the surface scan represented by the meshes, as the alignment is based on the more robust detection of the boundary targets. From the aligned meshes, a complete surface topography of the ISF part may be modeled, properties of the ISF part calculated, or any other desired analysis performed.

Figure 11:
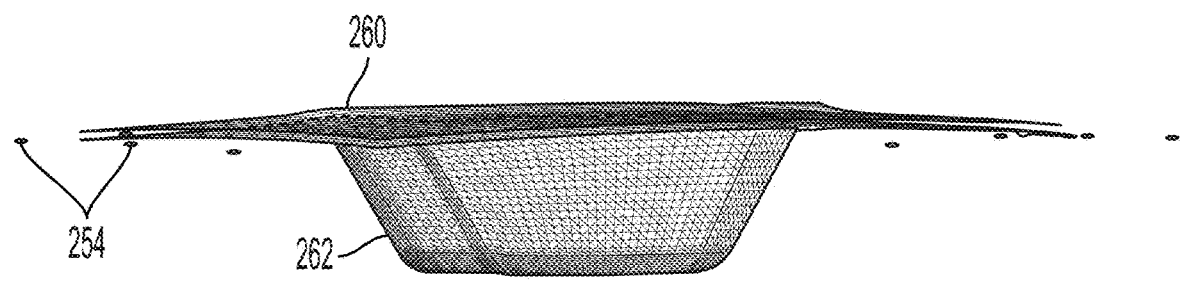
FIG. 11 is a side view of first and second triangulated meshes resulting from scanning the ISF part of FIG. 4 and aligned according to the selected boundary points.

In the present example, aligned meshes 260, 262 are used to calculate a thickness distribution 264 of ISF part 210, as shown in FIG. 11. From the meshes and/or associated point clouds, thickness may be calculated as a sample-point-to-surface distance. Appropriate and effective calculation, analysis, and refinement of such a distribution, including operations such as pre-processing of meshes 260, 262 may be well known to one skilled in the art.

B. Illustrative Method of Scanning Thickness

Figure 12:
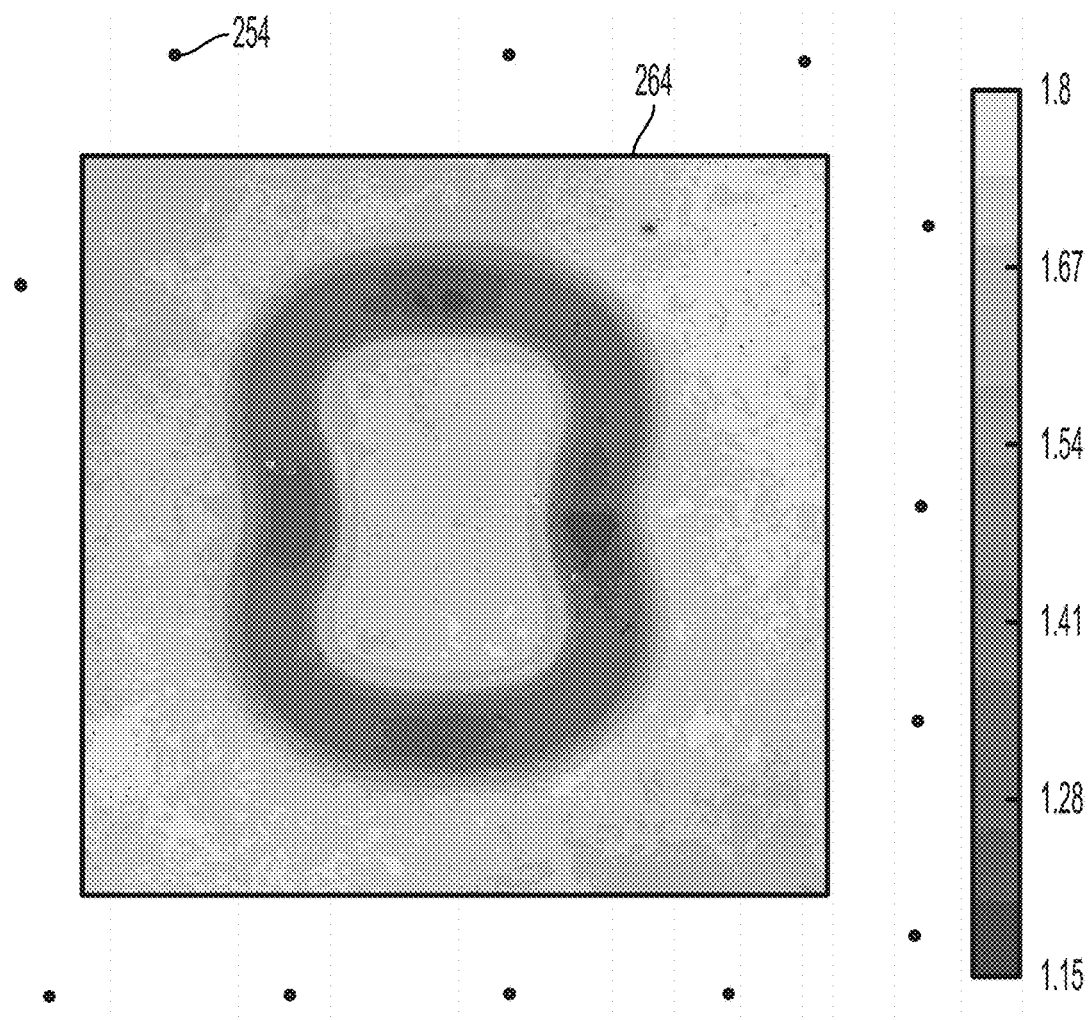
FIG. 12 is a thickness distribution chart for the ISF part of FIG. 3, calculated from the aligned triangulated meshes of FIG. 11.
Figure 13:
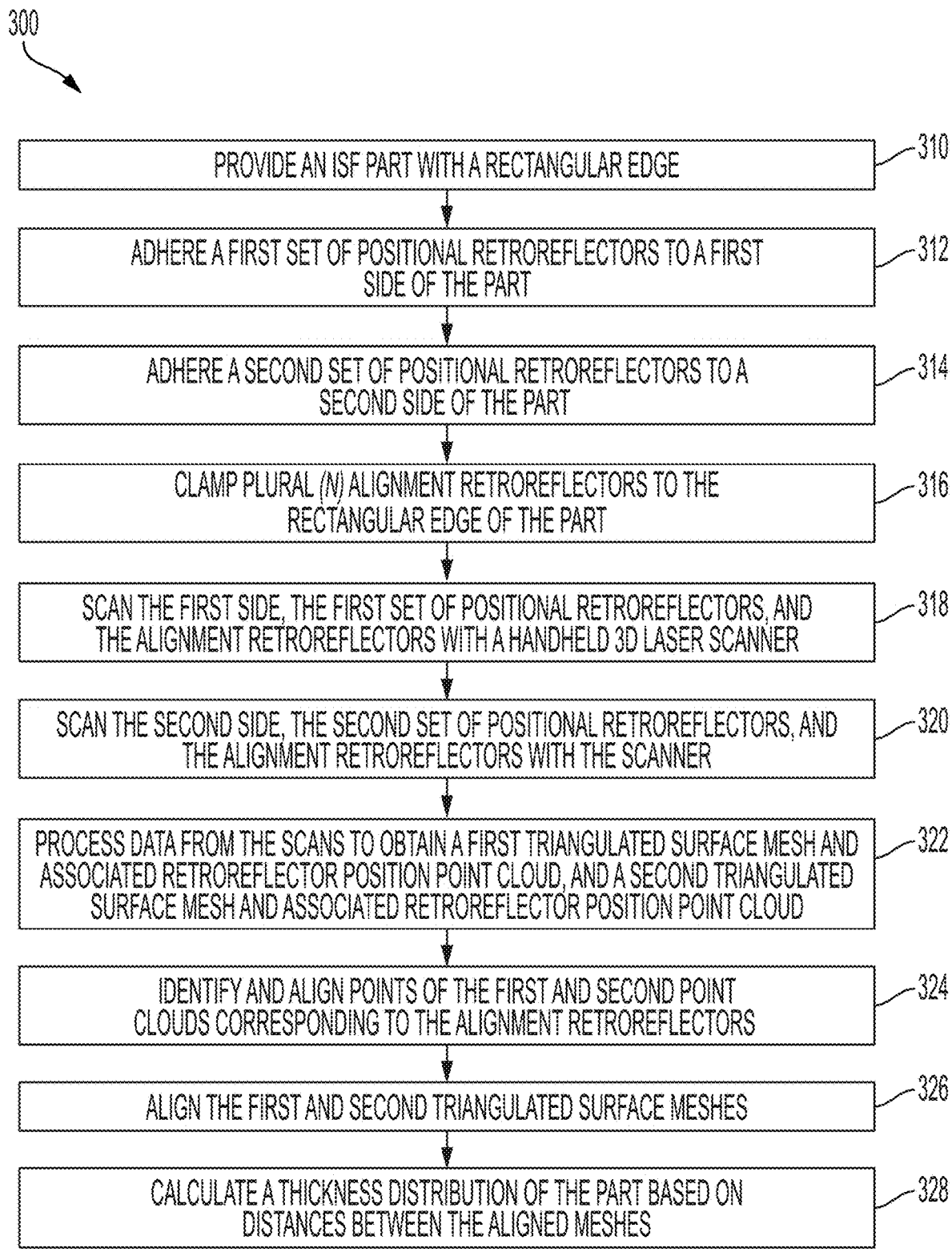
FIG. 13 is a flow chart depicting steps of an illustrative method for scanning a thickness distribution of an ISF part.

This section describes steps of an illustrative method 300 and sub-method 400 for scanning the thickness of an incrementally sheet formed (ISF) part; see FIGS. 12 and 13. Aspects of scanning methods and/or systems described above may be utilized in the method steps described below. Where appropriate, reference may be made to components and systems that may be used in carrying out each step. These references are for illustration and are not intended to limit the possible ways of carrying out any particular step of the method.

FIGS. 12 and 13 are flowcharts illustrating steps performed in an illustrative method and may not recite the complete process or all steps of the method. Although various steps of method 300 and sub-method 400 are described below and depicted in FIGS. 12 and 13, the steps need not necessarily all be performed, and in some cases may be performed simultaneously or in a different order than the order shown.

At step 310, the method includes providing an incrementally sheet formed (ISF) part with a rectangular edge. In the present example, the part comprises a deformed, non-planar piece of sheet metal. In general, the part or workpiece may be produced by any effective method and may include any material. For example, the part may include a laminated composite, machined aluminum, and/or an additively manufactured polymer. The part may have a planar edge, preferably rectangular. Additionally, the part may have a formed height that is less than a length or width of the edge.

Step 312 of the method includes adhering a first set of facial retroreflectors to a first side of the part. Step 314 includes adhering a second set of facial retroreflectors to a second side of the part. The first and second sides of the part may be opposing, and may meet at the rectangular edge of the part. The first and second sides may also be described as surfaces or facial surfaces of the part.

The retroreflectors of both the first and second sets of facial retroreflectors may have an adhesive backing, and be configured for easy application to and removal from the part. The retroreflectors may also be configured for use with and/or detection by a scanner or surface scanning device. Preferably, the retroreflectors may comprise part of the scanner system and may therefore be relatively inexpensive and readily available. For example, the retroreflectors may comprise circular stickers with a dark outer ring and inner retroreflective center, sold for use with a hand-held 3-D laser scanner such as the CreaForm HandySCAN 3D™.

Each of the first and second sets of facial retroreflectors may be adhered according to instructions and/or requirements of the scanner or scanning system used. In general, each of the first and second sets of facial retroreflectors may include at least approximately 7-8 retroreflectors, and may be positioned according to the surface topography of the corresponding side of the part. The retroreflectors may be distributed generally randomly, with sufficient density on each side to facilitate effective scanning. Steps 312 and 314 may be performed according to a standard scanning method for the selected scanner.

At step 316, the method includes clamping plural boundary retroreflectors to the rectangular edge of the part. More specifically, the method includes clamping N boundary retroreflectors to the edge, where N is any positive integer greater than three. At least three non-colinear boundary retroreflectors may be sufficient for alignment as described below, but more retroreflectors may be preferable to ensure accurate alignment. The boundary retroreflectors may be clamped to all four sides of the rectangular edge of the part, or may be clamped to only some of the sides. The boundary retroreflectors may be clamped in an orientation allowing detection by a scanner from either side of the part. For example, the boundary retroreflectors may be oriented perpendicular to the plane of the rectangular edge of the part.

The boundary retroreflectors may include the same adhesive retroreflectors used for the first and second sets of facial retroreflectors. For example, the adhesive retroreflectors may be applied to a flat surface of a clamp, for coupling to the edge of the part. Preferably, the boundary retroreflectors may also comprise part of the scanner system. Use of such retroreflectors may allow easy application of method 300 to an existing scanner system. Such application may allow a surface scanning device such as a handheld 3D laser scanner to perform precise thickness measurements, with no scanner modifications and only the addition of inexpensive clamps.

Step 318 includes scanning the first side of the part, the first set of facial retroreflectors, and the boundary retroreflectors with a handheld 3D laser scanner. The handheld scanner may be translated across the first side of the part by a user. Preferably, the scan may be completed with a minimum of movement by the user while extending sufficiently across the part to detect all of the boundary retroreflectors.

Before proceeding with step 320 of the method, the scanner and/or the part may be repositioned. If the part is sufficiently rigid and unaffected by movement, and the boundary retroreflectors are sufficiently fixed in place relative to the part, then the part may be freely flipped, rotated, or otherwise repositioned. However, for thin and/or large parts susceptible to flexing or shifting, it may be preferable to reposition the scanner to preclude introduction of systematic error. For example, the part may be supported in place by a stand through steps 318 and 320, and a user of the handheld 3D laser scanner may walk around the stand between the two steps.

Step 320 includes scanning the second side of the part, the second set of facial retroreflectors, and the boundary retroreflectors with the handheld 3D laser scanner. The handheld scanner may be translated across the first side of the part by a user, in the same manner as used in performing step 318 of the method. The scan may also extend sufficiently across the part to detect all of the boundary retroreflectors.

At step 322, the method includes processing data from the scans performed in steps 318 and 320. The data is processed to obtain a first triangulated surface mesh and associated retroreflector position point cloud, and a second triangulated surface mesh and associated retroreflector position point cloud. The first mesh may correspond to the first side of the part, and the second mesh may correspond to the second side of the part. The position points of the first point cloud may correspond to both the first set of facial retroreflectors and the boundary retroreflectors. Similarly, the position points of the second point cloud may correspond to both the second set of facial retroreflectors and the boundary retroreflectors.

Processing of the scan data may be performed by any appropriate data processing system, including but not limited to an onboard processor of the scanner, a computer in wired or wireless communication with the scanner, and/or a cloud processing resource in networked communication either directly with the scanner or indirectly with the scanner through a local computer. In some examples, such processing of the scan data may be a default and/or built-in functionality of the scanner and/or software designed for use with the scanner.

Step 324 includes identifying and aligning points of the first and second point clouds which correspond to the boundary retroreflectors. Step 324 may be performed on the same data processing system as step 322 and/or may be performed on another data processing system. For example, processing of the scan data in step 322 may be performed on the scanner. The scanner may then be USB connected to a laptop computer, and the processed scan data uploaded to the computer. Step 324 may then be performed on the laptop.

Figure 14:
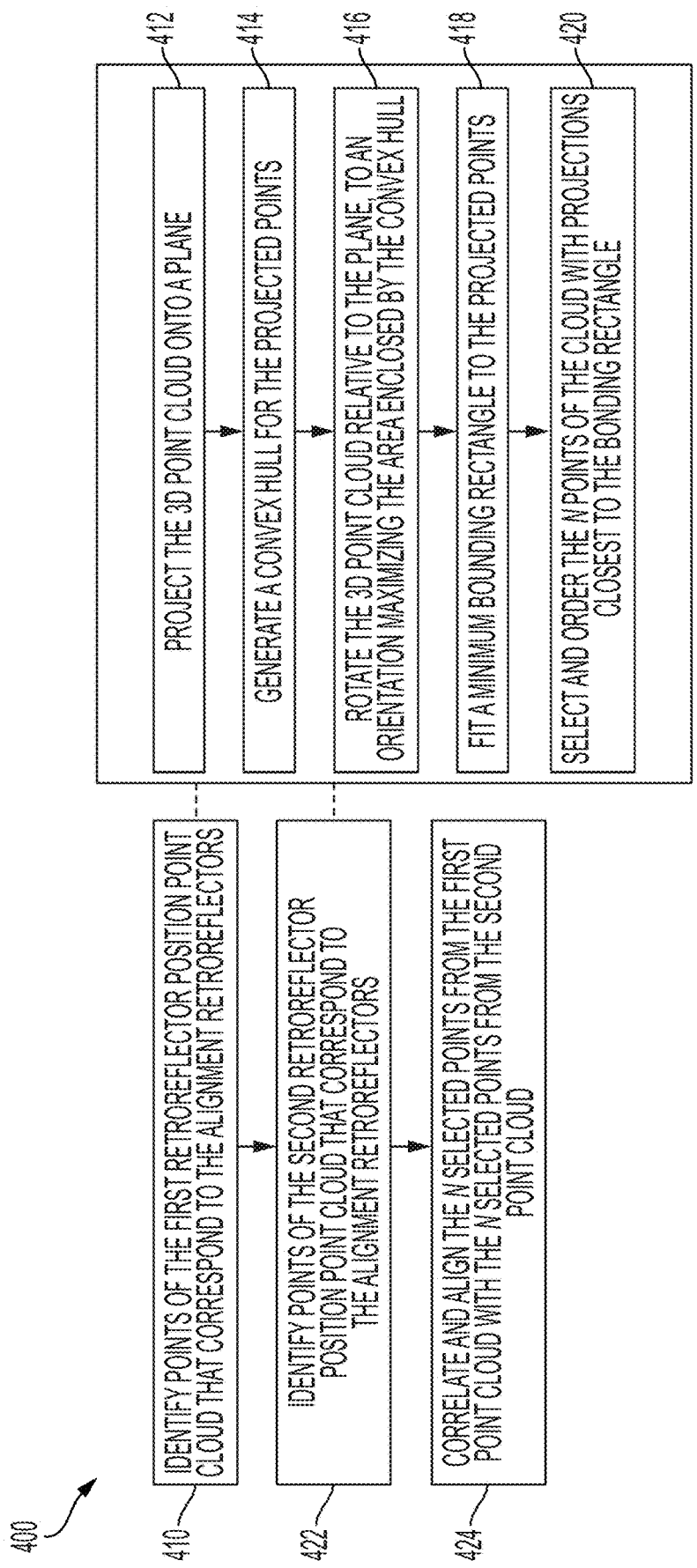
FIG. 14 is a flow chart depicting an illustrative method of performing the point cloud alignment step of the method of FIG. 13.

Step 324 may be performed in any effective manner. For example, each point cloud may be graphically depicted and displayed to a user, and the user may manually select the points in each point cloud which correspond to the boundary retroreflectors. For another example, data analysis software may be used to perform a least squares fit between all points of the first and second point clouds. Preferably, step 324 may be performed according to an efficient and robust algorithm such as illustrative method 400, shown in FIG. 14.

Step 410 of method 400 includes identifying which points of the first retroreflector position point cloud correspond to the boundary retroreflectors. The step may be performed according to sub-steps 412-420. Alternatively, the points may be identified manually, or by any effective method. However, steps 412-420 may be preferable as offering an efficient method of automatically identifying the relevant points, Sub-step 412 includes projecting the 3D point cloud onto a plane. For example, the point cloud may be represented as in a three-dimensional coordinate system and the point cloud may be projected onto the x-y plane of the coordinate system. Each position point of the point cloud may correspond to a projected point in the plane.

Sub-step 414 includes generating a convex hull for the projected points. The convex hull may be a convex polygon enclosing all projected points. In some examples, other bounding shapes may be used in place of the convex hull. For example, the minimum bounding rectangle or an alpha-hull may be used.

Sub-step 416 includes rotating the point cloud relative to the plane, to an orientation maximizing the area enclosed by the convex hull. For instance, the point cloud may be rotated in the three-dimensional coordinate system such that the area of the convex hull or other bounding shape in the x-y plane is maximized. As the point cloud is rotated relative to the plane, the projected point corresponding to each point of the cloud may move in the plane. The convex hull may change as the projected points move, increasing or decreasing area until the maximal area is found.

Sub-steps 414 and 416 may be described as establishing a planar boundary of the point cloud. The established planar boundary may correspond to the plane defined by the edge of the scanned part. Other methods of establishing a planar boundary may be used, such as performing a weighted least squares fit of a plane. However, steps 414 and 416 may reduce computation and processing time over other possible methods.

Sub-step 418 includes fitting a minimum bounding rectangle to the projected points. The rectangle may be fit to those projected points resulting from the orientation of the point cloud that maximizes area enclosed by the convex hull. The minimum bounding rectangle may correspond to the rectangular edge of the scanned part.

Sub-step 420 includes selecting and ordering the N points of the cloud with projections closest to the bounding rectangle, where N is the number of boundary retroreflectors clamped to the edge of the part. The selected points may therefore correspond to the boundary retroreflectors. The selected points may be cyclically ordered. In other words, for the set of selected points where each point is connected to the two closest points, a chordless cycle may be found and the points assigned a number according to order of occurrence in the cycle.

Step 422 includes identifying which points of the second retroreflector position point cloud correspond to the boundary retroreflectors. Step 422, like step 410, may be performed according to sub-steps 412-420 as described above, or by any effective method. After completing steps 410 and 422, there may be a cyclically ordered set of position points selected from each of the first and second point clouds. Each set of selected points may correspond to the same boundary retroreflectors.

Step 424 of method 400 includes correlating and aligning the N selected points from the first point cloud with the N selected points from the second point cloud. The first set of selected points may be differently ordered than the second set of selected points. That is, the ordering of the sets may be offset by any number between zero and N. The order may also be reversed between the two sets. The first and second sets of N selected points may be compared to eliminate this offset and/or reversal. Cyclically ordering the first and second sets of selected points may reduce the time and processing required for this process by limiting the comparison to only 2N sets of point pairs.

The first and second sets of selected points may then be aligned in a least squares sense. That is, each point selected from the first point cloud may be positioned relative to the correlated point selected from the second point cloud such that the sum of the squared differences between the positions of each pair of correlated position points is minimized. Any degeneracies introduced by projection and rotation of the point clouds in sub-steps 412 and 416 may now be eliminated.

Returning to FIG. 13, step 326 of method 300 includes aligning the first and second triangulated surface meshes obtained in step 322. The alignment of the selected boundary points of the first and second point clouds from step 324 may be applied via the known spatial relationship between the meshes and the point clouds to align the first and second meshes. Alignment of the meshes may be performed by any effective method known to those skilled in the art.

Step 328 includes calculating a thickness distribution of the part based on distances between the aligned meshes. Thickness may be calculated as a sample-point-to-surface distance. For example, a least distance between each point of the first point cloud and the triangulated mesh associated with the second point cloud may be calculated. Appropriate and effective calculation, analysis, and refinement of such a distribution, including operations such as pre-processing of the meshes may be well known to one skilled in the art.

Illustrative Combinations and Additional Examples

This section describes additional aspects and features of methods of aligning scans, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of aligning scans of a workpiece, comprising:

coupling a set of reflective boundary targets along an edge of a workpiece having first and second opposing facial surfaces, the boundary targets being detectable by a surface scanning device when scanning the first facial surface and when scanning the second facial surface of the workpiece, scanning the first facial surface of the workpiece, generating a first data set including spatial points corresponding to locations of the reflective boundary targets, scanning the second facial surface of the workpiece, generating a second data set including spatial points corresponding to locations of the reflective boundary targets, and aligning the spatial points of the first data set with the spatial points of the second data set.

A1. The method of A0, further comprising:

coupling a first set of reflective facial targets to the first facial surface of the workpiece, and coupling a second set of reflective facial targets to the second facial surface of the workpiece, wherein the first data set includes spatial points corresponding to locations of the first set of facial targets, the second data set including spatial points corresponding to locations of the second set of facial targets.

A2. The method of A1, further comprising:

calculating a thickness distribution of the workpiece based on the first and second data sets.

A3. The method of any of A0-A2, wherein the facial targets are retroreflective.

A4. The method of any of A0-A3, wherein the scanning steps include translating a hand-held 3D scanner across the facial surfaces.

A5. The method of any of A0-A5, wherein each of the scanning steps extends across the workpiece sufficiently to detect all of the reflective boundary targets.

A6. The method of any of A0-A5, wherein the aligning step includes generating a first triangulated surface mesh and associated first reflector position point cloud from the first data set, and generating a second triangulated surface mesh and associated second reflector position point cloud from the second data set.

A7. The method of A6, wherein the aligning step further includes selecting the spatial points corresponding to the locations of the reflective boundary targets from the reflector position point cloud, for each triangulated surface mesh.

A8. The method of A7, wherein the selecting step includes, for each of the first and second reflector position point clouds:
 projecting the reflector position point cloud onto a plane
 generating a convex hull for the projected points, and
 rotating the reflector position point cloud relative to the plane, to an orientation maximizing the area enclosed by the convex hull.

A9. The method of A8, wherein the selecting step further includes:
 fitting a minimum bounding rectangle to the projected points.

A10. The method of A9, further comprising;
 selecting and ordering projected points closest to the minimum bounding rectangle.

A11. The method of any of A7-A10, wherein the aligning step further includes:
 aligning the spatial points selected from the first reflector position point cloud with the spatial points selected from the second reflector position point cloud A12. The method of any of A0-A11, wherein the coupling step includes: clamping the reflective boundary targets to the edge of the workpiece.

B0. A method of measuring thickness of a workpiece, comprising:
 coupling a plurality of reflective targets to an edge of a workpiece having first and second sides,
 generating a first scan of the first side of the workpiece including detecting the plurality of reflective targets,
 generating a second scan of the second side of the workpiece including detecting the plurality of reflective targets,
 aligning the first and second scans, and
 determining a thickness of the workpiece based on data obtained from the first and second scans.

B1. The method of B0, wherein the reflective targets are clamped to the edge of the workpiece.

B2. The method of B0 or B1, wherein the workpiece includes a non-planar piece of sheet metal.

B3. The method of any of B0-B2, wherein the first side is opposite from the second side of the workpiece.

B4. The method of any of B0-B3, further comprising:
 coupling reflective facial targets to surfaces of the first and second sides of the workpiece, and detecting the facial targets in the first and second scans.

B5. The method of B4, wherein the aligning step includes generating a point cloud representing the surface of each the first and second sides of the workpiece, and rotating each point cloud to establish a planar boundary.

B6. The method of B5, wherein rotating the point cloud to establish a planar boundary includes projecting the point cloud onto an X-Y plane and rotating the point cloud to maximize area of a bounding shape.

B7. The method of B6, further comprising fitting a minimum bounding rectangle around the projection of the rotated point cloud, and selecting and ordering projected points closest to the minimum bounding rectangle.

C0. A system for measuring thickness of a workpiece, comprising:
 a set of reflective boundary targets configured for fastening to an edge of a workpiece,
 a set of facial targets configured for fastening to first and second opposing faces of the workpiece,
 a scanner configured to generate first and second scans of the first and second faces, detecting spatial locations of the boundary targets and facial targets, and
 a processor configured to align data sets from the first and second scans, and to calculate a thickness of the workpiece based on the data sets.

C1. The system of C0, wherein the processor is configured to:
 generate a point cloud corresponding to the opposing faces of the work piece, and
 rotate the point cloud to establish the boundary as planar, by projecting the point cloud on to an X-Y plane and rotating the point cloud to maximize area of a bounding shape.

C2. The system of C0 or C1, wherein the scanner is a hand-held laser scanner.

Advantages, Features, and Benefits

The different examples of the method of aligning scans described herein provide several advantages over known solutions for 3D scanning. For example, illustrative examples described herein allow accurate scanning of thin parts with commercially available hand-held laser scanners.

Additionally, and among other benefits, illustrative examples described herein allow first and second sides of a part to be scanned separately, limiting scan time and scanner movement during scanning.

Additionally, and among other benefits, illustrative examples described herein allow use of commercially available targets for alignment of scans.

Additionally, and among other benefits, illustrative examples described herein allow use of a hand-held laser scanner's existing positional target retroreflectors as alignment targets.

Additionally, and among other benefits, illustrative examples described herein allow accurate scanning without requiring input of separately measured parameters.

Additionally, and among other benefits, illustrative examples described herein use known parameters of scanned parts to produce a robust and deterministic fitting algorithm.

No known system or device can perform these functions, particularly with optimized processing time for the alignment. The illustrative examples described herein are particularly useful for measuring a thickness distribution of an incrementally sheet formed (ISF) part. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of aligning scans of a workpiece, comprising:
coupling a set of reflective boundary targets along an edge of a workpiece having first and second opposing facial surfaces, the boundary targets being detectable by a surface scanning device when scanning the first facial surface and when scanning the second facial surface of the workpiece;
scanning the first facial surface of the workpiece, generating a first data set including spatial points corresponding to locations of the reflective boundary targets;
scanning the second facial surface of the workpiece, generating a second data set including spatial points corresponding to locations of the reflective boundary targets; and
aligning the spatial points of the first data set with the spatial points of the second data set;
wherein the first and second opposing facial surfaces meet at the edge of the workpiece.

2. The method of claim 1, further comprising:
coupling a first set of reflective facial targets to the first facial surface of the workpiece; and
coupling a second set of reflective facial targets to the second facial surface of the workpiece, wherein the first data set includes spatial points corresponding to locations of the first set of facial targets, the second data set including spatial points corresponding to locations of the second set of facial targets.

3. The method of claim 2, further comprising:
calculating a thickness distribution of the workpiece based on the first and second data sets.

4. The method of claim 2, wherein the facial targets are retroreflective.

5. The method of claim 1, wherein the scanning steps include translating a hand-held 3D scanner across the facial surfaces.

6. The method of claim 1, wherein each of the scanning steps extends across the workpiece sufficiently to detect all of the reflective boundary targets.

7. The method of claim 1, wherein the aligning step includes generating a first triangulated surface mesh and associated first reflector position point cloud from the first data set, and generating a second triangulated surface mesh and associated second reflector position point cloud from the second data set.

8. The method of claim 7, wherein the aligning step further includes selecting the spatial points corresponding to the locations of the reflective boundary targets from the reflector position point cloud, for each triangulated surface mesh.

9. The method of claim 8, wherein the selecting step includes, for each of the first and second reflector position point clouds:
projecting the reflector position point cloud onto a plane;
generating a convex hull for the projected points; and
rotating the reflector position point cloud relative to the plane, to an orientation maximizing the area enclosed by the convex hull.

10. The method of claim 9, wherein the selecting step further includes:
fitting a minimum bounding rectangle to the projected points.

11. The method of claim 10, further comprising:
selecting and ordering projected points closest to the minimum bounding rectangle.

12. The method of claim 8, wherein the aligning step further includes:
aligning the spatial points selected from the first reflector position point cloud with the spatial points selected from the second reflector position point cloud.

13. A method of measuring thickness of a workpiece, comprising:
coupling a plurality of reflective targets to an edge of a workpiece having first and second sides;
generating a first scan of the first side of the workpiece including detecting the plurality of reflective targets;
generating a second scan of the second side of the workpiece including detecting the plurality of reflective targets;
aligning the first and second scans; and
determining a thickness of the workpiece based on data obtained from the first and second scans.

14. The method of claim 13, wherein the reflective targets are clamped to the edge of the workpiece.

15. The method of claim 13, wherein the workpiece includes a non-planar piece of sheet metal.

16. The method of claim 13, further comprising:
coupling reflective facial targets to surfaces of the first and second sides of the workpiece; and
detecting the facial targets in the first and second scans;
wherein the aligning step includes generating a point cloud representing the surface of each the first and second sides of the workpiece, and rotating each point cloud to establish a planar boundary.

17. The method of claim 16, further comprising fitting a minimum bounding rectangle around the planar boundary, and selecting and ordering projected points closest to the minimum bounding rectangle.

18. A system for measuring thickness of a workpiece, comprising:
a set of reflective boundary targets configured for fastening to an edge of a workpiece;
a set of facial targets configured for fastening to first and second opposing faces of the workpiece;
a scanner configured to generate first and second scans of the first and second faces, detecting spatial locations of the boundary targets and facial targets; and
a processor configured to align data sets from the first and second scans, and to calculate a thickness of the workpiece based on the data sets.

19. The system of claim 18, wherein the processor is configured to:
generate a point cloud corresponding to the opposing faces of the work piece; and
rotate the point cloud to establish the boundary as planar, by projecting the point cloud on to an X-Y plane and rotating the point cloud to maximize area of a bounding shape.

20. The system of claim 18, wherein the scanner is a hand-held laser scanner.

* * * * *